Patented Mar. 13, 1934

1,950,813

UNITED STATES PATENT OFFICE

1,950,813

PRODUCTION OF CANDLES

Wilhelm Pungs, Ludwigshafen-on-the-Rhine, and Michael Jahrstorfer, Mannheim, Germany, assignors to I. G. Farbenindustrie Aktiengesellschaft, Frankfort-on-the-Main, Germany No Drawing. Application August 10, 1931, Serial No. 556,319. In Germany August 30, 1930

9 Claims. (Cl. 87—21)

The present invention relates to the production of candles.

We have found that valuable candles can be prepared by casting or drawing candles in the usual manner with non-fibrous organic combustible fatty substances equally employed as the combustible materials for the production of candles mixed with at least 20 per cent of their weight of normally solid aliphatic alcohols. The normally solid (saturated) aliphatic alcohols may be recovered in any usual and convenient manner by the saponification of natural waxes in which they are usually present in the form of esters, as for example bees wax, sperm oil, spermaceti, carnauba, shellac or Montan waxes. They may also be prepared by reducing the acids, or mixtures thereof, contained in natural waxes, i. e. waxes of vegetable, animal or mineral origin, and fats and oils of vegetal, i. e. animal and vegetable origin, such as cotton seed oil, linseed oil, castor oil, rapeseed oil, olive oil, peanut oil, stearine, whale, seal or fish oils and the like, or their synthetic substitutes obtained by destructively oxidizing paraffin wax with the aid of air, or by reducing derivatives of such acids, such as esters with mono- or polyhydric aliphatic alcohols or anhydrides, for example in the presence of cobalt or nickel with the aid of hydrogen or gases containing the same, and at a temperature between about 180° and about 250° C. while maintaining a pressure between about 100 and about 250 atmospheres. The alcohols obtained by reducing mixtures of acids of high molecular weight containing mainly from about 27 to about 29 carbon atoms, obtainable by the treatment of Montan wax with chromic acid for example according to applicants' Patent No. 1,777,766 have proved especially suitable. As the combustible fatty substances may be mentioned for example paraffin wax, bees wax, tallow, spermaceti, stearine, stearic acid or synthetic fatty acids of high molecular weight, for example from the destructive oxidation of paraffin wax, middle oils and like hydrocarbon mixtures with the aid of air, the proportions being selected according to the purpose in view, the hardness of the candles usually rising with the content of alcohols. If desired, the whole non-fibrous combustible constituents of the candles may consist of the aforesaid alcohols but for many purposes the candles may then be too hard and liable to breakage. The content of alcohols should be, however, as high as possible, the valuable properties of the candles rising with the content of alcohols, and very good results in any respect being obtained with a content of from about 25 to about 50 per cent of the said alcohols. The preparation of the candles from the said alcohols and usual candle making material is effected in any known and suitable manner.

The addition of normally solid aliphatic alcohols offers considerable advantages. For example the candles solidify particularly uniformly in the moulds; they may be very readily removed therefrom and have a smooth, opaque appearance. Furthermore, since the said alcohols are extremely readily absorbed even by thin wicks, candles of the said kind burn very quietly and with a strongly luminous non-smoky flame; they do not drip nor do they form deep cups.

The following examples will further illustrate the nature of this invention but the invention is not restricted to these examples. The parts are by weight.

Example 1

Candles with a cotton wick are cast in the usual manner from a fused mixture (about 85° C.) of equal parts of hard paraffin wax and of the mixture of alcohols of high molecular weight obtainable by the catalytic hydrogenation, with the aid of hydrogen at about 200° C., at a pressure of about 200 atmospheres and in the presence of metallic nickel, of a Montan wax which has been bleached with chromic acid and the acids of which bleached wax have been esterified with methyl alcohol before the hydrogenation. The candles may be removed from the mould without difficulty; they are entirely homogeneous and have a smooth appearance. They are also distinguished by excellent combustibility, illuminating power and stability even at summer temperatures.

Example 2

50 parts of the alcohols employed in Example 1, 10 parts of octodecyl alcohol, 137 parts of paraffin wax and 3 parts of an acid mixture obtainable by bleaching Montan wax with chromic acid according to the Patent No. 1,777,766 are fused together at about 90° C. and cast into candles with a cotton wick. The candles thus prepared are distinguished by very good illuminating power and high stability to heat.

Example 3

A melt (about 85° C.) of 25 parts of the mixture of alcohols referred to in Example 1, 15 parts of stearine and 60 parts of paraffin wax is cast into candles. The candles thus prepared possess a very good illuminating power and burn slowly without dripping.

*Example 4*

A melt (about 90° C.) of 30 parts of myricyl alcohol and 70 parts of beeswax is cast into candles. The candles obtained are highly resistant to heat and possess a very good illuminating power and burn very uniformly and quietly.

What we claim is:—

1. As new articles of manufacture, candles the non-fibrous constituents of which consist of organic, combustible, solid fatty substances which comprise at least 20 per cent by weight of normally solid aliphatic alcohols.

2. As new articles of manufacture, candles the non-fibrous constituents of which consist of organic, combustible, solid fatty substances which comprise at least 20 per cent by weight of normally solid aliphatic alcohols obtainable by reducing the acids of natural waxes and oils and fats of vegetable origin.

3. As new articles of manufacture, candles the non-fibrous constituents of which consist of organic, combustible, solid fatty substances which comprise at least 20 per cent by weight of normally solid aliphatic alcohols obtainable by reducing the acids of mineral waxes.

4. As new articles of manufacture, candles the non-fibrous constituents of which consist of organic, combustible, solid fatty substances which comprise at least 20 per cent by weight of normally solid aliphatic alcohols obtainable by reducing the acids of Montan wax.

5. As new articles of manufacture, candles the non-fibrous constituents of which consist of from about 25 to about 50 per cent by weight of normally solid aliphatic alcohols and another organic combustible, solid, fatty substance.

6. As new articles of manufacture, candles the non-fibrous constituents of which consist of normally solid aliphatic alcohols.

7. As new articles of manufacture, candles the non-fibrous constituents of which consist of from about 25 to about 50 per cent by weight of normally solid aliphatic alcohols, obtainable by reducing the acids of Montan wax, and paraffin wax.

8. As new articles of manufacture, candles the non-fibrous constituents of which consist of from about 25 to about 50 per cent by weight of normally solid aliphatic alcohols, obtainable by reducing the acids of Montan wax, and stearine.

9. As new articles of manufacture, candles the non-fibrous constituents of which consist of from about 25 to about 50 per cent by weight of normally solid aliphatic alcohols obtainable by reducing the acids of Montan wax, and stearine and paraffin wax.

WILHELM PUNGS.
MICHAEL JAHRSTORFER.